Sept. 29, 1970  A. WIRTH  3,531,178
GLARE PREVENTION FOR AN INDICATING DATA DISPLAY DEVICE
Filed Sept. 9, 1968  6 Sheets-Sheet 1

INVENTOR.
ARMIN WIRTH
BY Stevens, Davis, Miller & Mosher
ATTORNEYS

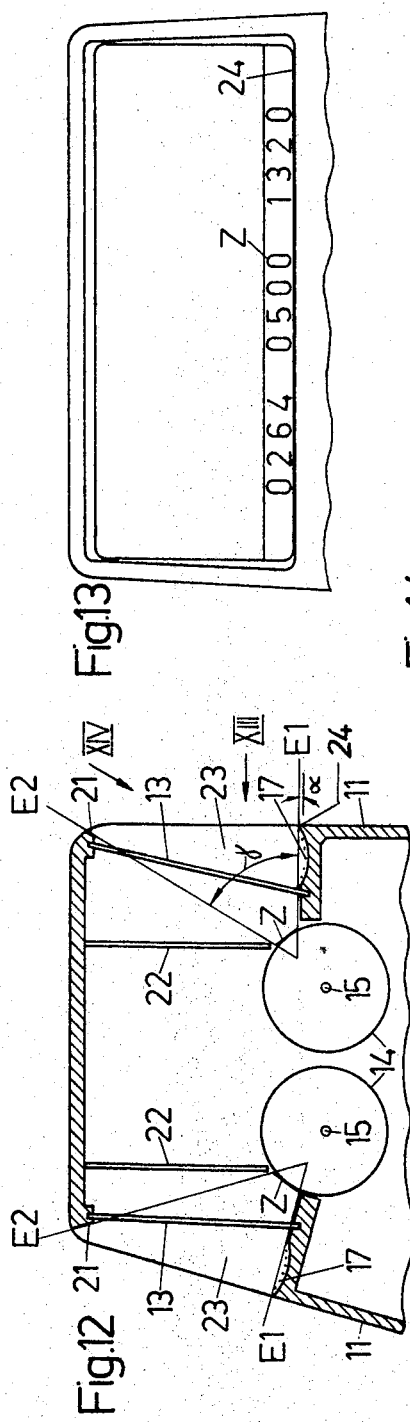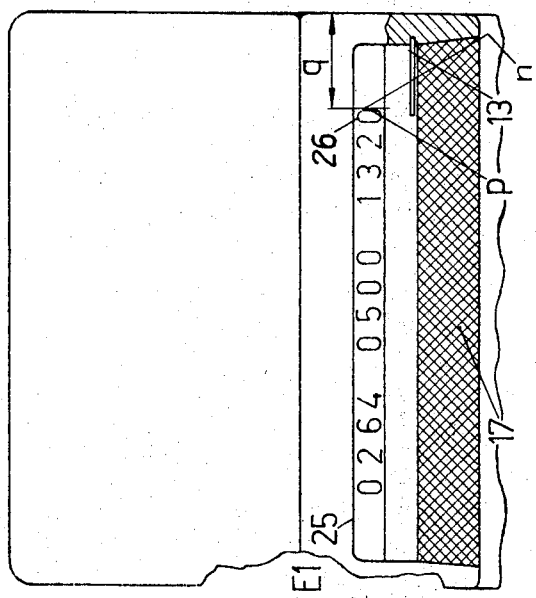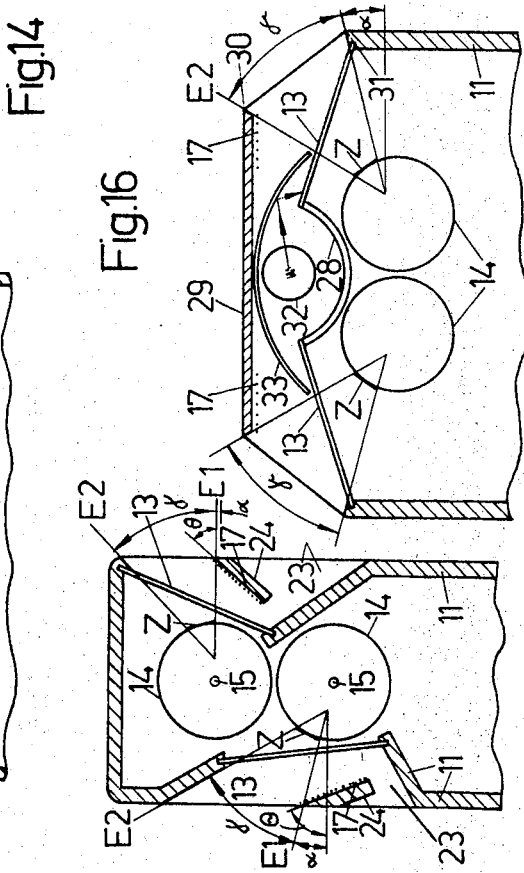

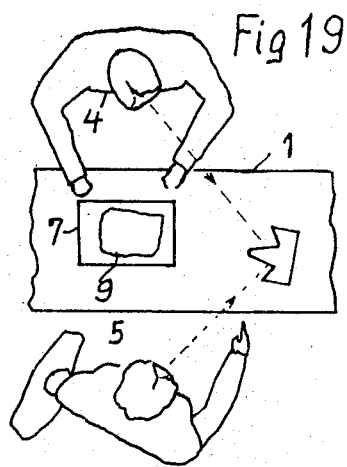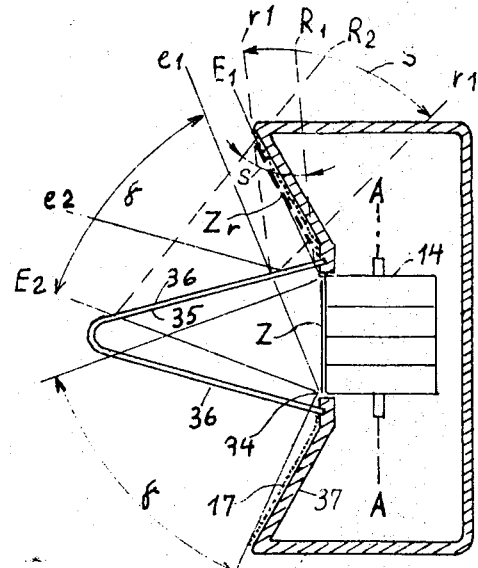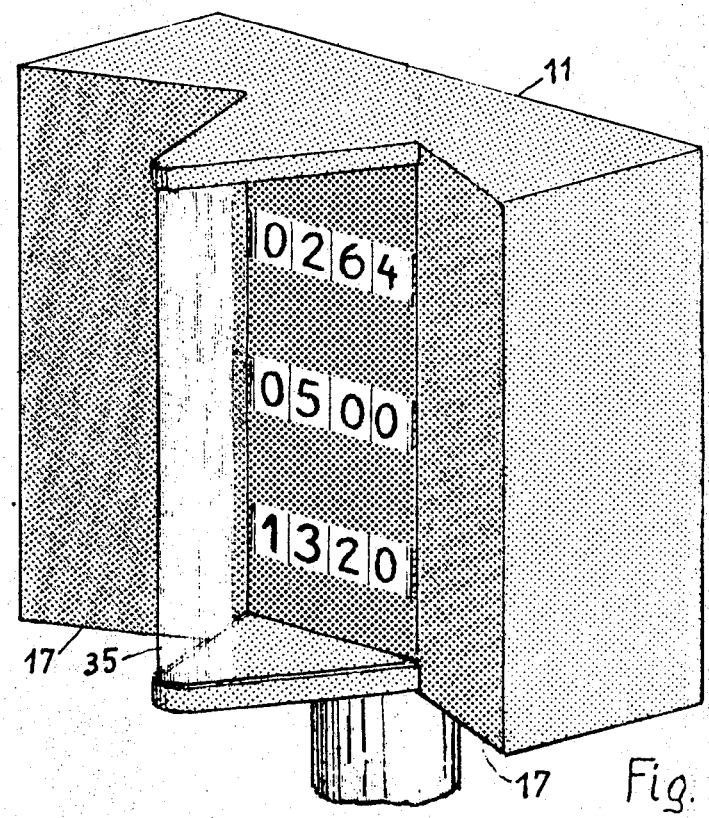

United States Patent Office 3,531,178
Patented Sept. 29, 1970

1

3,531,178
GLARE PREVENTION FOR AN INDICATING
DATA DISPLAY DEVICE
Armin Wirth, Zurich, Switzerland, assignor to Gallo
Wirth & Co., Zurich, Switzerland
Filed Sept. 9, 1968, Ser. No. 758,394
Claims priority, application Switzerland, Sept. 25, 1967,
13,393/67
Int. Cl. G02b 27/02
U.S. Cl. 350—113                 9 Claims

ABSTRACT OF THE DISCLOSURE

A display device for indicating data to two oppositely facing viewers in a manner whereby both may easily view said data from different eye levels. The invention includes the use of a window whose edges determine the angularity of four marginal incident rays and the use of an optically dark surface extending through the field of such rays.

---

Figure 1:
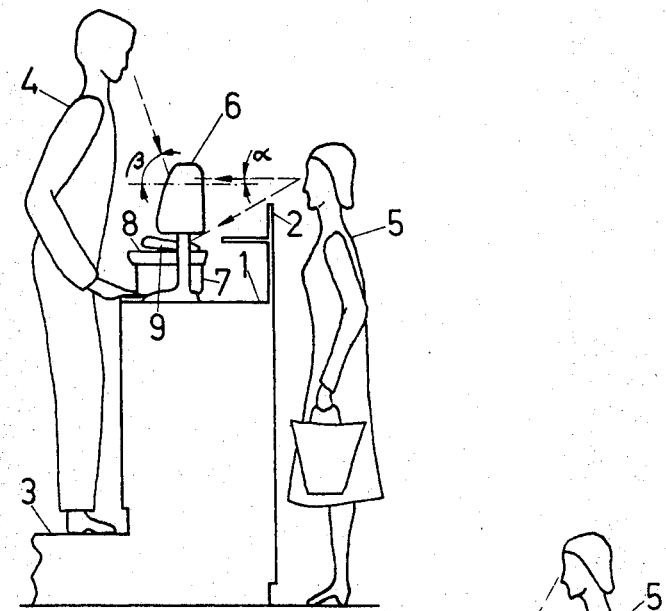

The present invention relates to display device for measured and entered data in measuring and recording instruments, particularly in price computing weighing machines and cash registers, which in their casing contain at least one set of elements bearing digits behind a transparent plate.

In shop counter weighing machines arrangements for displaying data on both sides of the machine are well known, the intention being that both the salesman and the customer should be able to read them. In the development of so-called inclination balances this has led in course of time to typical forms of construction either in the form of a fan-shaped dial-type head and, more particularly, for weighing machines which also indicate price, in the form of a horizontal cylinder which gives readings on each side of the machine, for instance along two parallel diametrically opposite generators. Short, disc-shaped cylinders which display readings on their cylindrical surface are also known. In the two latter arrangements it is desirable that the readings should be roughly at eye level to minimize parallax error. Weighing machines in which the readings are on a cylinder surface are the least favourable in the latter respect, because generally these arrangements also comprise a cylinder lens for magnifying the reading, and the sensitivity to parallax error is thereby increased. Other devices have been proposed to mitigate this effect. Nevertheless, it is considered a drawback that the structural height of the means of display required to bring the reading to eye level obstructs the direct line of sight between the salesman and the customer and usually also prevents the latter from seeing the goods.

On the other hand, a form of construction with an elevated indicating head may also have advantages with regard to the space occupied by the weighing machine, since the disposition of the indicating means above the machine does not increase the space occupied on the counter top.

Inclination balances in which the indicating means are low and disposed on each side of the machine, sometimes in association with optical projection means, have been designed, but they have not been very favourably received, partly perhaps because the space on the counter occupied by such a machine is unduly large.

2

Besides weighing machines of the above-described kind in which the indications are usually given by a pointer on a graduated scale, weighing machines have been proposed in which the indications are largely or wholly given in digital form, for instance in weighing machines in which a price list is optically projected. The readings usually appear on a vertical ground glass screen. However, the luminosity of the numbers projected on a screen is rather poor, particularly since considerable magnification is usually required. This is due to the fact that the projecting beam has its greatest intensity in the centre and the brilliance of the indication diminishes considerably the further the viewer stands to one side or the other. Moreover, in daylight or in a shop which is well lit the visibility of the indication may become wholly unsatisfactory when viewed at increasing angles, i.e. when the viewer is not in line with the projection beam and also because the contrast itself is too weak. The use of perpendicular ground glass screens and the structural height required for projection and for accommodating the mechanism also generally means that the indicating heads still obstruct the direct line of sight between the salesman and the customer and that the visibility of the goods from the customer's side is by no means better than in weighing machines provided with direct indicating means.

Weighing machines in which the measured quantities are electronically computed and indicated by digit glow tubes or mechanically operated indicating mechanisms in which the digits are individually projected have also been proposed. From the point of view of reading facilities they are likewise not fully satisfactory and also fairly expensive to produce. Moreover, normally they require more space and indicating surface than shop counter weighing machines are desired to occupy.

It is therefore the object of the present invention to provide an arrangement for indicating measured quantities, particularly for price computing weighing machines, which eliminates the drawbacks of conventional arrangements. According to the invention this is achieved by securing a transparent plate in the casing in a window which is high enough to provide an angular viewing aperture of at least 25°, in such manner that the four marginal incident rays which are determined by the edges of the window fall on the glass plate at angles of same sign not less than 3°, and by providing an optically dark surface which extends through the field defined by the four incident rays partially reflected from the glass plate.

Figure 2:
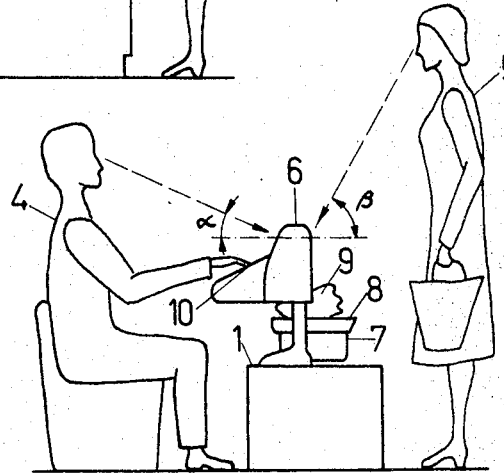
Figure 3:
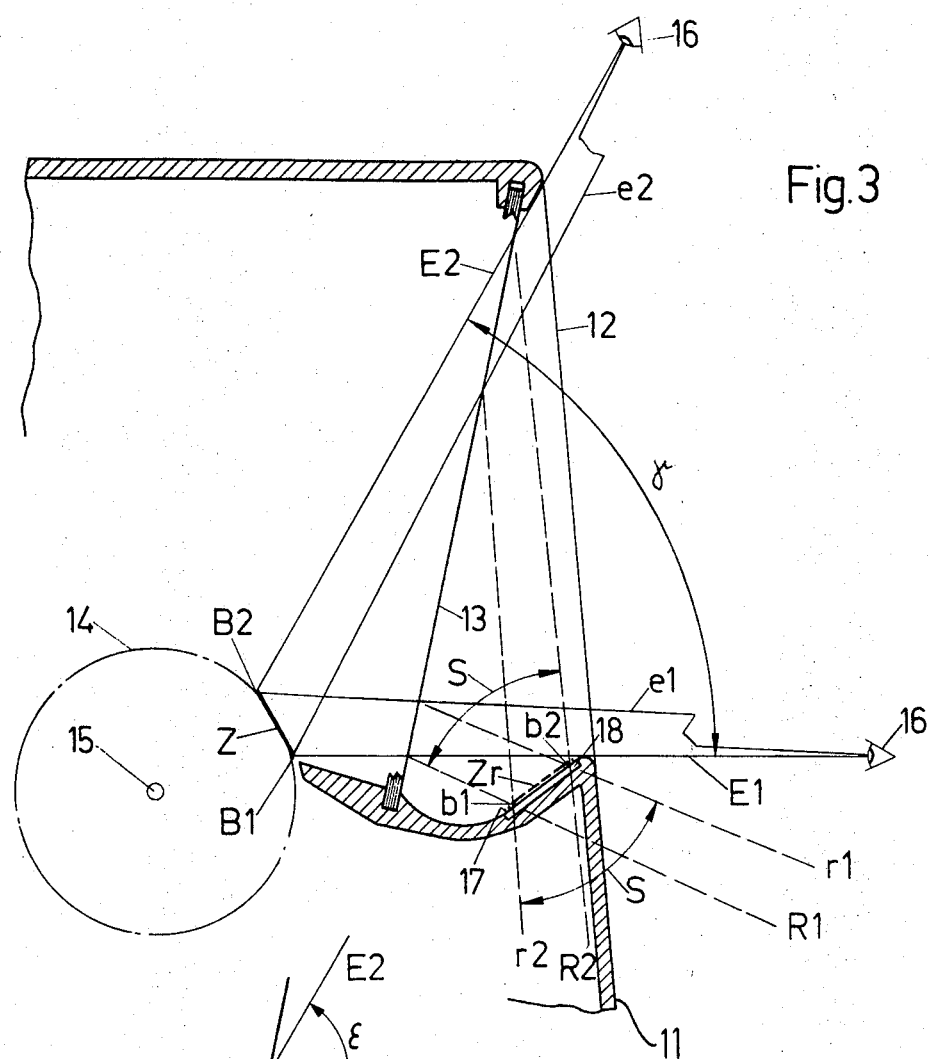

Embodiments of the invention are schematically illustrated in the accompanying drawings in which FIGS. 1 and 2 illustrate two different possible positions of a weighing machine on a shop counter, FIG. 3 is a fragmentary larger scale section of one embodiment, FIG. 3a is a detail of FIG. 3, FIGS. 4–11 are different forms of the low reflectance dark surface, FIG. 12 is a cross section of another embodiment, FIG. 13 is a view in the direction of the arrow XIII in FIG. 12, FIG. 14 is a view in the direction of the arrow XIV in FIG. 12, FIGS. 15 and 16 are two further embodiments, FIG. 17 is a plan view of a side-reading indicating head, FIG. 18 is a perspective representation of the embodiment according to FIG. 17, and FIG. 19 is a plan view of the arrangement shown in FIGS. 17 and 18.

FIG. 1 illustrates the general conditions obtained when the weighing machine stands on a high counter with an elevated frontal structure 2. The salesman 4 in this example stands on an elevated platform 3, whereas the customer 5 stands on the shop floor facing the counter 1. The display device 6 is a unit separate from the weighing machine 7 itself. The goods 9 lie on the weighing platform 8 of the weighing machine 7. The device 6 provides for a reading on both sides. If the customer 5 is a rather short person his or her angle of sight will be more or less horizontal, the minimum viewing angle $\alpha$ being substantially zero. On the other hand, the salesman 4 sees the indication from above downwards, and his viewing angle $\beta$ is considerable, nearly the maximum possible.

FIG. 2 illustrates the conditions obtained when the salesman is seated. In this case the smaller viewing angle $\alpha$ is that of the salesman, whereas the large viewing angle $\beta$ is on the customer's side. The display device 6 may be provided with a keyboard 10 for entering the price per unit of weight.

In both cases the display device 6 as well as the goods 9 are within the direct line of vision of both the customer 5 and the salesman 4.

FIG. 3 is a schematic section of part of the display device 6. The casing 11 has an opening 12 closed by a glass plate 13. Behind the glass plate 13 number wheels 14 are mounted on a common shaft 15. The number wheels 14 are operated by conventional drive means not shown in the drawing. Z is the digit or number that is to be displayed, $B_1$ and $B_2$ being the bottom and upper ends of the digit. The eye 16 of an observer (salesman 4 or customer 5) is normally between 30 and 100 cm. away from the indicating head (this is not shown to scale in the drawing). According to existing conditions the eye may be at about the same level as the number wheels 14 or higher or very much higher. The angular viewing aperture $\gamma$ may be say 60°. $E_1$, $e_1$ and $E_2$, $e_2$ are the incident rays corresponding to these two extreme positions of the observer's eye 16. The angular viewing aperture $\gamma$ is therefore defined by the two marginal rays $E_1$ and $E_2$. The angle of incidence $\epsilon$ (FIG. 3a) of the ray $E_2$ is therefore greater than the angle of incidence $\delta$ of the ray $E_1$ which should preferably be at least 5°. The angle of incidence of the rays $e_1$ and $e_2$ should be at least 3°.

These four rays $E_1$, $e_1$, $E_2$, $e_2$ are partly reflected at the glass surface 13, $R_1$, $R_2$, $r_1$, $r_2$ being the reflected rays which define a field S. At the narrowest point of this field S the virtual mirror image $Zr$ of the digit Z is formed. It will be understood that for any angle of incidence within the angular aperture the virtual mirror image of the digit Z will be at $Zr$. In this area a black matt surface 17 is mounted on a backing plate 18 in the casing 11. The eye 16 of an observer will therefore always see a partial reflection on the glass plate 13 of this dark surface 17. Bright reflections which would interfere with a clear view will not therefore occur. The digit Z will appear as if it were not covered by a sheet of glass at all.

For achieving a satisfactory effect it is unnecessary for the surface 17 to be jet black. It is quite sufficient that its reflectance in the visible spectral region should be low, for instance that it should be say dark grey and matt. Nor is it necessary that the surface 17 should exactly coincide with the mirror image $Zr$, but it is nevertheless best to locate it in the close vicinity of the mirror image. The low reflectance surface F may be part of the casing itself, of a frame or special diaphragm, or it may be created by a suitable coating of paint.

FIGS. 4 to 11 schematically illustrate a number of possibilities that are available.

Figure 4:
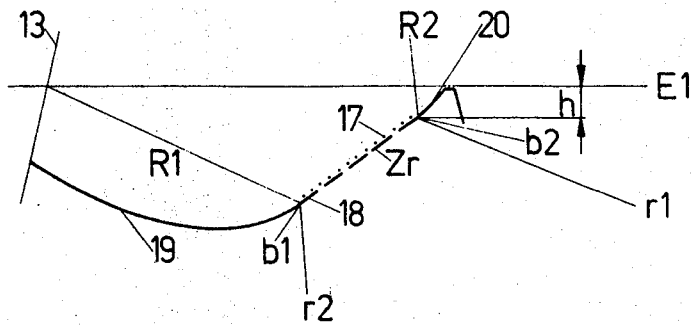

In FIG. 4 the edges $b_1$, $b_2$ of the low reflectance surface approximately coincide with the edges of the mirror image $Zr$. A continuation 19 of this surface extends to the glass plate 13, whereas a second continuation 20 rises to the level of the lower ray $E_1$. The area of the low reflectance surface 17 for crossing the entire field S in this arrangement is a minimum. The elements 18, 19 and 20 may form parts of the frame of the glass plate 13 or part of the casing 11. This also applies to the following FIGS. 5 to 11.

Figure 5:
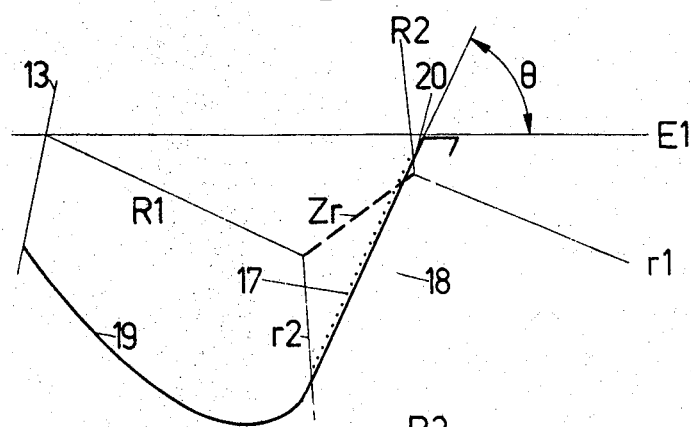

In FIG. 5 the surface 17 extends from near the point of intersection of the ray $E_1$ with the reflected ray $R_2$ substantially behind the mirror image $Zr$ at an angle $\theta$ to the ray $E_1$ exceeding the angular aperture $\gamma$. The surface 17 will thus remain substantially or completely invisible to an observer, even when the angle of his or her line of sight is a maximum (FIGS. 1, 2), and this may also be desirable from a purely aesthetic point of view. A continuation 20 of 17 extends to the lower ray $E_1$.

Figure 6:
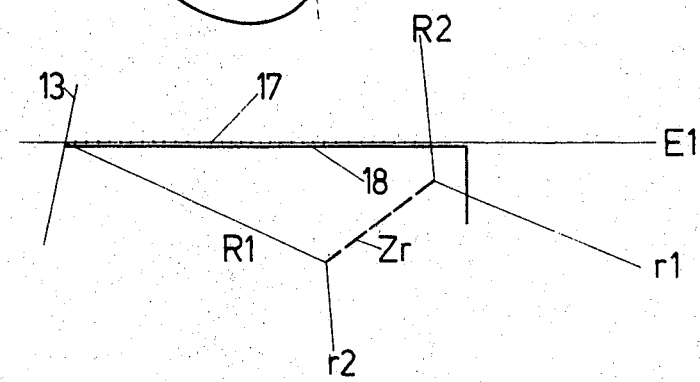

In FIG. 6 the surface 17 is located in front of the mirror image $Zr$, namely just outside the lower ray $E_1$, approximately touching the latter, and thus bounding the image. This surface therefore crosses the field S from the surface 13 to the second ray $R_2$.

Figure 7:
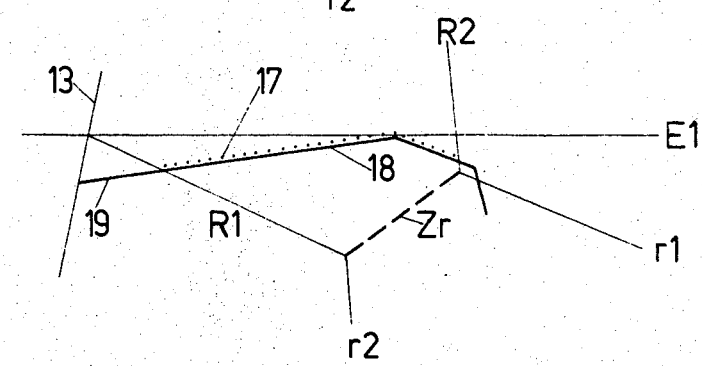

In FIG. 7 the surface 17 likewise crosses the field S in front of the mirror image $Zr$. It contains a break or it is convex and just touches the lower ray $E_1$ at least at one point.

Figure 8:
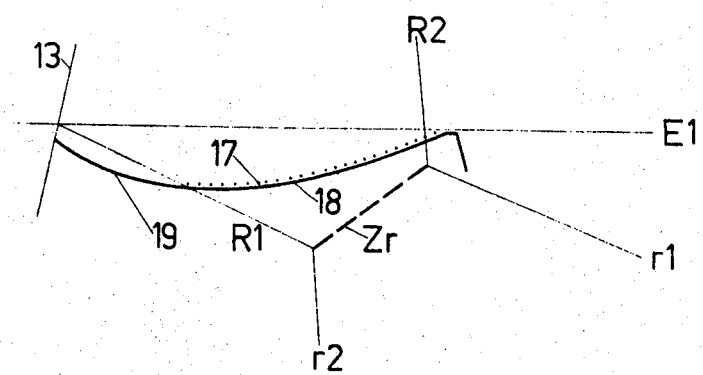

In FIG. 8 the surface 17 is concave, also traversing the field S in front of the mirror image $Zr$, touching the lower ray $E_1$ closely outside the second marginal reflected ray $R_2$.

Figure 9:
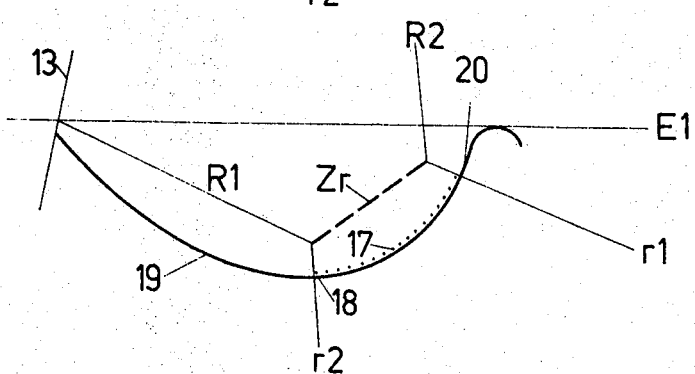

In FIG. 9 the surface 17 is likewise concave, but it traverses the field S behind the mirror image $Zr$ and has an extension 20 to the lower ray $E_1$.

Figure 10:
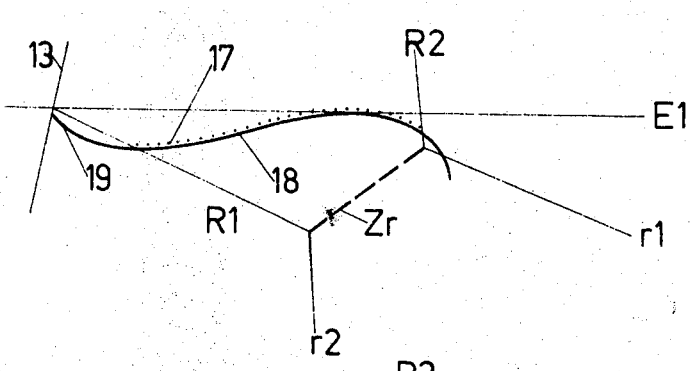

In FIG. 10 the surface 17 traverses the field S in front of the mirror image $Zr$, but its shape is concave-convex in such manner that it contacts the lower ray $E_1$ at least at one point.

Figure 11:
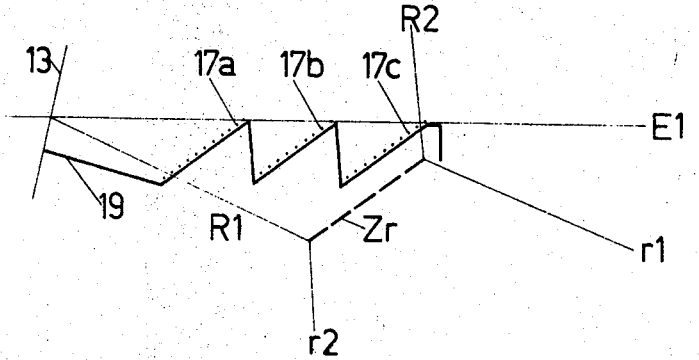

In FIG. 11 the surface 17 is divided into sectional surfaces 17a, 17b, 17c arranged in the manner of a venetian blind in such manner that every reflected ray within the field S will be intercepted.

FIGS. 3 to 11 illustrate the conditions for an angular viewing aperture $\gamma$ of 60°. Naturally this angle could be smaller or it could also be slightly larger, if desired.

The foregoing description is somewhat simplified in that it leaves the thickness of the glass plate 13 and the parallel displacement of rays partly reflected at the inner surface of the glass out of consideration. However, the error thus introduced can be readily compensated by slightly enlarging the area of the surface 17.

FIG. 12 is a cross section of an embodiment intended for a shop counter weighing machine in which the viewing apertures are asymmetrical, the average viewing angle of the salesman being greater. A number wheel 14 displays a digit Z behind a sheet of glass 13 on the side facing the salesman (on the left in FIG. 12) and can be seen at a minimum angle of sight $\alpha$ (related to the horizontal) of 15° and at a maximum angle of sight of 75°, so that the total available viewing aperture $\gamma$ is 60°. The glass is inclined at an angle of 93°. The surface 17 is illustratively shown to be concave and forms a part of the casing 11, its outer edge touching the lower ray $E_1$, as in FIG. 8. The upper frame 21 for the glass touches the upper line of sight. A mask 22 prevents the interior of the casing from being seen. On the opposite side of the casing the window faces the customer, the lower angle of sight being $\beta=0°$ so that for a similar angular viewing aperture $\gamma=60°$ the glass plate 13 is inclined at an angle of 78°. A second number wheel 14 displaying the digit Z is mounted at the same level and the other parts of the arrangement correspond to those on the side facing the salesman. Preferably lateral shielding walls 23 conforming to the external contours are provided on each side of the glass windows.

FIG. 13 shows the arrangement according to FIG. 12 viewed in the direction of the arrow XIII. The digits Z are visible at the bottom edge of the window.

FIG. 14 is a view of the arrangement according to FIG. 12 seen in the direction of the arrow XIV at a slanting angle from above. The digits Z are now visible at the upper edge 25. The line $n$ shows that, provided the surface F is extended sufficiently far on each side beyond the last digit 26 (distance $q$) interfering reflections will also be suppressed even when the indicated digits are viewed obliquely at an angle indicated by the line $p$.

FIG. 15 is a cross section of another embodiment of the proposed device for counter weighing machines. Since in this instance the angular viewing aperture $\gamma$ is reduced to 45° and the number wheels are disposed the one above the other the width of the indicating head can be substantially reduced by comparison with an arrangement according to FIG. 12. The disposition of the surfaces 17 calls for some comment. They are mounted inside the side walls 23 on a special support 24 at an angle $\theta$ to the ray $E_1$ which exceeds the angular viewing aperture $\gamma$ (FIGS. 1 and 5) so that the surface 17 is practically invisible. The support 24 is so mounted that it is not an obstruction when the glass window 13 and the surface 17 are to be cleaned.

FIG. 16 is a cross section of a double-sided arrangement in which the minimum angle of sight $\alpha$ is 15° and the angular viewing aperture $\gamma$ is 45°. Contrary to the arangements hitherto described the reflected rays are here not deflected downwards but upwards. Inside the casing 11 the number wheels 14 are side-by-side. The glass plate 13 is moderately inclined and supported at one end by the casing 11 and at the other end rests on a bearing member 28. The angular viewing aperture $\gamma$ is 45°. The rays $R_1$, $R_2$, $r_1$, $r_2$ are reflected obliquely upwards and fall on the low reflectance surface 17 underneath the cover 29. The surface 17 is thus invisible from the outside. The edge 30 of the cover 29 and the edge 31 of the casing 11 limit the angular viewing aperture $\gamma$. The cover 29 which may be detachable, carries an incandescent lamp 32, preferably backed by a concave reflector 33 for projecting its light through the glass plate 13 for illuminating the digit Z.

In the embodiments so far described the plane normal to the reflecting surface (or the plane of the drawings showing the cross sections) is vertical. However, this is not necessarily so and other arrangements may in fact offer particular advantages.

FIG. 17 is a cross section of an arrangement for readings on two sides in which the plane normal to the reflecting glass surface is not in the vertical, but horizontal or inclined about a preferably horizontal axis A—A. If the normal plane to the reflecting surface is horizontal the display device is preferably located roughly at eye level, for instance above the shop counter, laterally offset from the direct line between the salesman and the customer. Direct vision between the salesman and the customer is not therefore obstructed and the goods are also open to direct view. If it is desired to locate the indicating head at a lower level, it is turned about the axis A—A, i.e. the side provided with the glass is lifted.

A set of number wheels 14 is mounted inside a casing 11. The digits that are to be read appear in an opening 34 in the casing 11, this opening being covered by a curved glass plate 35 having side faces 36. The angular viewing aperture $\gamma$ is shown on each side, as well as incident and reflected rays, the mirror image $Zr$ of the digits and the field S. The two low-reflectance surfaces 17 are affixed to reentrant faces 37 of the casing. In a price computing shop counter weighing machine three groups of number wheels are preferably located the one above the other for indicating weight, unit price and total price of the goods. It is a particular advantage of this arrangement that the indications need not be duplicated, since the salesman and the customer can read the same set of figures.

FIG. 18 is a general perspective view of the arrangement described with reference to FIG. 17, containing three sets of number wheels, the one above the other.

FIG. 19 illustrates the arrangement according to FIGS. 17 and 18. The salesman 4 and the customer 5 face each other across the counter. The weighing machine 7 carrying the goods 9 stands on the counter between them and a display device as illustrated in FIGS. 17 and 18 stands on the side.

The described embodiments coupled with shop counter weighing machines do not occupy a large surface. They are easy to transport in a shop and they are universally applicable. The weight of the goods, the unit price and the price of the weighed quantity of goods in digital form—each in the form of four-digit numbers, making a total of twelve digits and the necessary intervals—may, if desired, be presented in linear alignment both when viewed by the salesman and by the customer. The described device does not obstruct the direct line of sight between the salesman and the customer at head height and down to chest level. Both can read the indications irrespectively of the position of the indicating head, whether on a low or high counter or even a very low stand, for instance in the open, on counters containing refrigerating cabinets or provided with superstructures, irrespectively as to whether the salesman stands or sits on a more elevated platform above the customer and so forth.

All the above described embodiments comprise flat glass windows 13. Arched glass windows (for instance slightly concave to the outside) can be used, although they hardly afford optical advantages and may have drawbacks, such as higher cost and higher demands upon the precision of workmanship.

I claim:

1. Display device for measured and entered data in measuring and recording instruments, comprising a casing, a window in said casing, a transparent glass plate secured in said window, at least one set of elements bearing digits mounted in said casing behind said transparent glass plate, said window providing an angular viewing aperture of 25° to 60°, each of the two extreme limits of said angular viewing aperture defining two incident rays with the edges of said window, said incident rays falling on said transparent glass plate at angles of same sign not less than 3°, and an optical dark surface extending through a field limited by the portion of said incident rays that are partially reflected from said transparent glass plate.

2. Display device according to claim 1, in which said optically dark surface is at least approximately coincident with the virtual mirror image of the digits of the elements of said set.

3. Display device according to claim 1, in which said optically dark surface is placed at an angle to the one of said partially reflected incident rays, defined by one of said extreme limits of said angular viewing aperture, which is greater than said angular viewing aperture.

4. Display device according to claim 1, in which said optically dark surface touches the one of said incident rays defined by one of said extreme limits of said angular viewing aperture, at least at one point.

5. Display device according to claim 1, in which said optically dark surface extends directly below the one of said incident rays defined by one of said extreme limits of said angular viewing aperture, and parallel thereto.

6. Display device according to claim 1, in which said optically dark surface is concave and located in front of the virtual mirror image of the digits of the elements of said set.

7. Display device according to claim 1, in which said optically dark surface is concave and located behind the virtual mirror image of the digits of the elements of said set.

8. Display device according to claim 1, in which said optically dark surface is concave-convex and touches an incident ray at least at one point.

9. Display device according to claim 1, in which said optically dark surface is divided into parallel parts.

References Cited

UNITED STATES PATENTS

| | | |
|---|---|---|
| 1,671,272 | 5/1928 | Buckingham. |
| 1,984,561 | 12/1934 | Zinke _____ 350—114 X |
| 2,622,137 | 12/1952 | Peter et al. |

FOREIGN PATENTS

| | | |
|---|---|---|
| 403,149 | 12/1933 | Great Britain. |
| 465,928 | 5/1937 | Great Britain. |
| 768,470 | 5/1934 | France. |

DAVID SCHONBERG, Primary Examiner

P. R. MILLER, Assistant Examiner

U.S. Cl. X.R.

350—276, 283, 284